United States Patent [19]

Joormann

[11] 4,392,167
[45] Jul. 5, 1983

[54] MAGNETIC HEAD, METHOD OF PRODUCING THE MAGNETIC HEAD

[75] Inventor: Hendrik J. M. Joormann, Eindhoven, Netherlands

[73] Assignee: U.S. Philips Corporation, New York, N.Y.

[21] Appl. No.: 200,112

[22] Filed: Oct. 24, 1980

[30] Foreign Application Priority Data

Jun. 18, 1980 [NL] Netherlands .......................... 8003518

[51] Int. Cl.³ .......................... G11B 5/22; G11B 5/251
[52] U.S. Cl. ..................................... 360/120; 360/125
[58] Field of Search ............... 360/120, 127, 125, 122, 360/119, 121

[56] References Cited

U.S. PATENT DOCUMENTS

| 3,249,700 | 5/1966 | Duinker et al. | 360/119 |
| 3,375,575 | 4/1968 | Visser et al. | 360/120 |
| 3,458,926 | 8/1969 | Maissel et al. | 360/127 |
| 3,544,982 | 12/1970 | Hanak | 360/120 |
| 3,624,897 | 12/1971 | Reade et al. | 360/127 |
| 3,721,000 | 3/1973 | Okamoto et al. | 29/603 |
| 3,751,803 | 8/1973 | Fisher | 360/119 |
| 3,781,486 | 12/1973 | Maryatt et al. | 360/120 |
| 4,172,318 | 10/1979 | Huntt | 360/120 |
| 4,217,613 | 8/1980 | Schwartz | 360/119 |

Primary Examiner—Alfred H. Eddleman
Attorney, Agent, or Firm—Norman N. Spain

[57] ABSTRACT

Magnetic head and method of producing a magnetic head which is formed by a core assembled from two pole pieces. At least one layer of a non-magnetizable material which forms the useful gap is provided between the pole pieces. One embodiment of the method includes the step of deposition on the pole pieces by means of a sputtering method a layer of a glass which comprises 12–20% by weight of $Al_2O_3$, 40–48% by weight of $B_2O_3$ and a total of 35–45% by weight of one or more of the oxides BaO, CaO or SrO. Thereafter the pole pieces are pressed together, with the glass layers in contact, and bonded together by heating the glass to the softening point, followed by cooling.

5 Claims, 9 Drawing Figures

MAGNETIC HEAD, METHOD OF PRODUCING THE MAGNETIC HEAD

The invention relates to a magnetic head having a core of a magnetizable material which is interrupted by a gap in which at least one layer of a non-magnetizable material has been provided, and to a method of producing a magnetic head, the method comprising the following steps: The formation of a first and a second pole piece of a magnetic material; the machining of a face of each of the pole pieces in such manner as to serve as a gap-defining surface; the provision of at least one layer of a non-magnetizable material on the gap-defining surface of at least one of the two pole pieces; the joining of the gap-defining surfaces of the two pole pieces provided with the said gap layer to secure them together, whereafter a winding is provided around at least one of the pole pieces.

Magnetic heads are used to record, reproduce and/or erase magnetic information. They are used in, for example, tape recorders for recording and/or reproducing sound information or picture information.

United Kingdom Patent Specification No. 1,317,634 discloses such a magnetic head and a method of producing same. With the known magnetic head the layer of non-magnetizable material consists of a glass having a softening point of 450°–650° C., for example a glass containing 60% by weight of PbO, 16% by weight of $SiO_2$, 14% by weight of $B_2O_3$ and 10% by weight of ZnO. The glass may be provided by means of sputtering. According to this prior art a second layer, consisting of a non-magnetisable material, metal oxide, metal boride, metal nitride, silicon oxide or a ferrite which is non-magnetizable at ambient temperature, may be provided between the layer of non-magnetizable material and the core of magnetisable material.

The glass used in the known magnetic head has the disadvantage that the composition of the glass is not constant, that is to say that on sputtering of the glass, some constituents are more easily deposited onto the gap-defining surfaces than other constituents, so that the composition of the glass after sputtering is not equal to the composition of the starting glass.

The invention provides a glass which does not have the above-mentioned disadvantage.

According to the invention, the magnetic head is characterized in that the layer of non-magnetizable material consists of a mixture of 95-100% of a glass containing 12-20% by weight of $Al_2O_3$, 40-48% by weight of $B_2O_3$ and a total of 35-45% by weight of one or more of the oxides BaO, CaO or SrO, and 0-5% by weight of additional constituents.

The method according to the invention is further preferably characterized in that a layer of non-magnetizable material consisting of a glass containing 12-20% by weight of $Al_2O_3$, 40-48% by weight of $B_2O_3$ and a total of 35-45% by weight of one or more of the oxides BaO, CaO or SrO is used.

Quite surprisingly it was found that a glass having a composition as specified above can be deposited by sputtering on a gap-defining surface with a composition which corresponds to the composition of the glass used as the starting material.

Preferably, the magnetic head in accordance with the invention is characterized in that the glass has the following composition: 16% by weight of $Al_2O_3$, 44% by weight of $B_2O_3$ and a total of 40% by weight of one or more of the oxides BaO, CaO or SrO. Good results were obtained with a glass containing 40% by weight of BaO. Preferably, a second layer consisting of a non-magnetizable metal, metal oxide, metal boride, metal nitride, silicon oxide or a ferrite which is non-magnetizable at ambient temperature, is provided between the layer of non-magnetizable material and the core of magnetizable material.

The method in accordance with the invention preferably employs a glass which contains 16% by weight of $Al_2O_3$, 44% by weight of $B_2O_3$ and a total of 40% by weight of one or more of the oxides BaO, CaO or SrO, or, which is still more preferred, 40% by weight of BaO. Good results were obtained when a first layer, consisting of a non-magnetizable metal, metal oxide, metal boride, metal nitride, silicon oxide or a ferrite which is non-magnetizable at ambient temperature, is first deposited on the two gap-defining surfaces, whereafter the layer of non-magnetizable material is provided on at least one of the gap-defining surfaces.

The use of an (intermediate) layer between the glass and the magnetic material pole pieces has the advantage that dissolving of the magnetic material in the glass of the gap can almost completely be prevented. Consequently, the layer of non-magnetizable material in the gap cannot be contaminated by more than 5% by weight of constituents from the magnetic material or from the intermediate layer.

The invention will now be further explained by way of non-limiting example with reference to the drawing in which.

Figure 1:
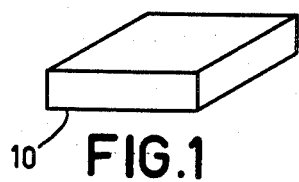
FIG. 1 shows a block of ferrite which is used as the starting material.
Figure 2:
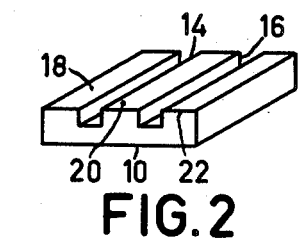
FIG. 2 shows a machined pole piece.

A block of material 10 which may be manufactured from polycrystalline (sintered) or monocrystalline ferrite (FIG. 1) is given the shape shown in FIG. 2 by means of standard techniques. As shown in FIG. 2, two slots 14 and 16 are found in the block and the faces 18, 20 and 22 are polished so as to serve as gap-defining surfaces.

Figure 3A:
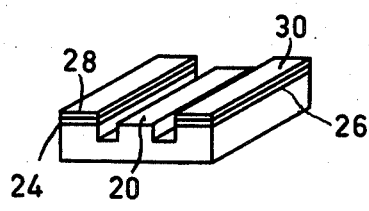
FIG. 3A and FIG. 3B show the applied layers for the formation of the useful gap, FIG. 4A

First layers 24 and 26 are provided on the faces 18 and 22, respectively (see FIG. 3A) by using known techniques of masking and deposition. By masking the central face 20 no deposition is found thereon. These first layers 24 and 26 should comprise a non-magnetizable material which does not, or only to a very low extent, reacts with the ferrite. Suitable materials for this purpose are certain nitrides and borides (for example boron nitride and silicon nitride), metals (for example Cr), metal oxides (for example oxides of Be, Mg, Al, Ti, Zr, Sn or Ta), silicon oxide and ferrite which is non-magnetizable at ambient temperature; most of these materials can easily be deposited by means of a sputtering method.

It should be noted that tin oxide can be deposited by means of a spraying method, for example starting from $SnCl_4$, at a temperature of ±500° C.

A good manner of depositing a thin layer of $SiO_2$ is also that of the so-called reactive vapour deposition. In this method a mixture of $SiH_4$ and $O_2$ is fed into a furnace which is kept at a temperature of approximately ±400° C. and in which the pole pieces are present. A homogeneous layer of $SiO_2$ appears to form on the pole pieces.

Second layers 28 and 30 are deposited on the first layers 24 and 26, respectively. These second layers consist of a glass comprising 12-20% by weight of $Al_2O_3$, 40-48% by weight of $B_2O_3$ and a total of 35-45% by weight of one or more of the oxides BaO, CaO or SrO. A suitable glass has, for example, 16% by weight of $Al_2O_3$, 44% by weight of $B_2O_3$ and 40% by weight of BaO. This glass allows quantitative deposition by means of sputtering.

Figure 3B:
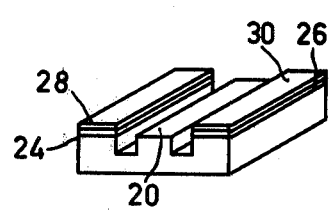

The sum of the thicknesses of the layers 24 and 28 determine the ultimate gap length. First and second layers are provided on a second pole piece (FIG. 3B) in the same manner as described above. These layers are provided with the same indices as the corresponding layers in FIG. 3A.

Figure 4A:
FIG. 4B shows the layers provided for the formation of the back gap.
Figure 4B:
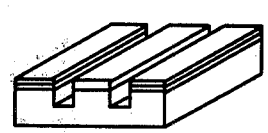

In the following stage of the method (FIGS. 4A and 4B) the layers deposited on the pole pieces are covered with a mask and layers for forming the back gap are deposited on the non-covered faces 20. For this purpose a material is preferably used having a comparatively large permeability ($\mu > 1$) so that a back gap is formed having a reluctance which is considerably smaller than that of the operative gap.

Figure 5:
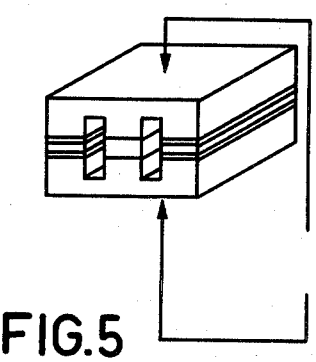
FIG. 5 shows the pole pieces assembled to form a head.
Figure 6:
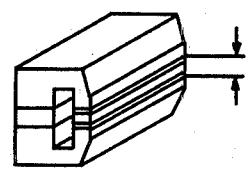
FIG. 6 shows a magnetic head comprising an operative face.
Figure 7:
FIG. 7 shows the final magnetic head.

The pole pieces are then bonded to one another with the glass layers in contact (FIG. 5) and heated in an oven at a temperature which is sufficiently high to soften the glass layer (for example approximately 650°), the pole pieces being pressed against each other at a pressure of 20-70 kg/cm². After cooling, the pole pieces are rigidly bonded together and can then be further machined to obtain a magnetic head of the desired shape. The assembly can, for example, be machined and polished in such manner that the assembly shown in FIG. 6 is obtained, which has an operative face. As is shown in FIG. 7, said assembly can be sliced into separate segments which each constitute a magnetic head.

After bonding of the pole pieces the layers 28 and 30 may become mixed, by diffusion with 0-5% by weight of constituents originating from the layers 24 or from the material 10.

What is claimed is:

1. A magnetic head having a core of a magnetizable material which is interrupted by a gap in which at least one layer of a substantially non-magnetizable material has been provided, characterized in that one layer of substantially non-magnetizable material consists of a mixture of 95-100% of a glass comprising 12-20% by weight of $Al_2O_3$, 40-48% by weight of $B_2O_3$ and a total of 35-45% by weight of one or more of the oxides BaO, CaO or SrO and 0-5% by weight of additional constituents.

2. A magnetic head as claimed in claim 1, characterized in that the glass consists of 16% by weight of $Al_2O_3$, 44% by weight of $B_2O_3$ and a total of 40% by weight of one or more of the oxides BaO, CaO or SrO.

3. A magnetic head as claimed in claim 2, characterized in that the glass comprises 40% by weight of BaO.

4. A magnetic head as claimed in claim 1, 2 or 3, characterized in that a second layer consisting of a non-magnetizable metal, metal oxide, metal boride, metal nitride, silicon oxide or a ferrite which is non-magnetizable at ambient temperature, is provided between the layer of substantially non-magnetizable material containing glass and said core.

5. A magnetic head as claimed in claim 4, characterized in that the additional constituents of the magnetizable material or of the second layer as claimed in claim 4 are diffused into said glass containing layer of substantially non-magnetizable material.

* * * * *